(12) United States Patent
Ishihara

(10) Patent No.: US 8,288,301 B2
(45) Date of Patent: Oct. 16, 2012

(54) DIELECTRIC CERAMIC AND LAMINATED CERAMIC CAPACITOR

(75) Inventor: Masayuki Ishihara, Yasu (JP)

(73) Assignee: Murata Manufacturing Co., Ltd., Nagokakyo-Shi, Kyoto-fu (JP)

( * ) Notice: Subject to any disclaimer, the term of this patent is extended or adjusted under 35 U.S.C. 154(b) by 232 days.

(21) Appl. No.: 12/691,084

(22) Filed: Jan. 21, 2010

(65) Prior Publication Data

US 2010/0195260 A1   Aug. 5, 2010

(30) Foreign Application Priority Data

Jan. 30, 2009   (JP) ................. 2009-019019

(51) Int. Cl.
*C04B 35/468* (2006.01)
(52) U.S. Cl. ...... 501/137; 501/138; 501/139; 361/321.4
(58) Field of Classification Search ............ 501/137, 501/138, 139; 361/321.4
See application file for complete search history.

(56) References Cited

U.S. PATENT DOCUMENTS

| | | | |
|---|---|---|---|
| 6,514,895 B1 * | 2/2003 | Chiu et al. ............ | 501/137 |
| 6,737,179 B2 * | 5/2004 | Sengupta ............ | 428/702 |
| 7,323,428 B2 | 1/2008 | Ito et al. | |
| 7,706,125 B2 * | 4/2010 | Fukuda et al. ....... | 361/311 |
| 2002/0072464 A1 | 6/2002 | Nakamura et al. | |
| 2007/0203014 A1 | 8/2007 | Watanabe | |

FOREIGN PATENT DOCUMENTS

| | | |
|---|---|---|
| CN | 1767100 A | 5/2006 |
| CN | 101026035 A | 8/2007 |
| JP | 3389408 B2 | 3/2003 |
| JP | 2004-107200 A | 4/2004 |
| JP | 2004155649 A | 6/2004 |
| JP | 2004-292271 A | 10/2004 |
| JP | 2006-173352 A | 6/2006 |
| JP | 2007-063114 A | 3/2007 |
| WO | 2006103954 | * 10/2006 |

OTHER PUBLICATIONS

Japanese Office Action dated May 17, 2011 for corresponding application JP 2009-019019 (and English translation of same).
Japanese Office Action issued for corresponding application JP 2009-019019, dated Apr. 10, 2012.
Chinese Office Action issued for corresponding application CN 201010002172.4, issued Jun. 4, 2012 (English translation attached).

* cited by examiner

*Primary Examiner* — Karl Group
(74) *Attorney, Agent, or Firm* — Dickstein Shapiro LLP

(57) ABSTRACT

A dielectric ceramic containing $ABO_3$ in which A is Ba, possibly with at least one of Ca and Sr, and B is Ti, possibly with at least one of Zr and Hf as its main component, and Si as a accessory component. The dielectric ceramic includes main phase grains containing the $ABO_3$ main component and secondary phase grains having a composition different from that of the main phase grains. The ratio of the Si content in the secondary phase grains to the total content of Si in the dielectric ceramic is 40% or more so that more Si is distributed in the secondary phase grains. It is preferable that the Si content in secondary phase grains be 30 mol % or more.

12 Claims, 2 Drawing Sheets

DIELECTRIC CERAMIC AND LAMINATED CERAMIC CAPACITOR

BACKGROUND OF THE INVENTION

1. Field of the Invention

The invention relates to a dielectric ceramic, and a laminated ceramic capacitor configured with the use of the dielectric ceramic, and more particularly, relates to an improvement for making the dielectric constant of a dielectric ceramic higher.

2. Description of the Related Art

One of effective means for satisfying the demands of reduction in size and increase in capacitance for laminated ceramic capacitors is making the dielectric ceramic layers included in laminated ceramic capacitors thinner.

However, thinner dielectric ceramic layers not only make it more difficult to ensure realizing the required electrical insulation properties, but causes the problem that the electric field strength per dielectric ceramic layer is increased which easily decrease the dielectric constant. Therefore, there is a demand for increasing the dielectric constant of the dielectric ceramic constituting the dielectric ceramic layers as much as possible in the laminated ceramic capacitors, in order to satisfy the needs of reduction in size and increase in capacitance.

A technique for increasing the dielectric constant of a dielectric ceramic containing a barium titanate as its main component is proposed in, for example, Japanese Patent Application Laid-Open No. 2002-201065 (Patent Document 1). The dielectric ceramic described in Patent Document 1 will be described with reference to FIG. 3 which schematically illustrates an enlarged conventional dielectric ceramic 21.

The dielectric ceramic 21 described in Patent Document 1 contains a barium titanate as its main component, and includes main phase grains 22 containing the main component, and a composite oxide containing a rare earth metal and Si is produced at a grain boundary (including a triple point) 23. This phase containing Si is a low dielectric constant phase. Further, such a low dielectric constant phase is thinly and widely distributed at the grain boundary 23 in the dielectric ceramic 21 described in Patent Document 1.

Assuming that the dielectric ceramic 21 is used for constituting the dielectric ceramic layers provided in the laminated ceramic capacitor, when a line in the lamination direction is drawn between internal electrodes, the main phase grains and grain boundaries are distributed, such as a main phase grain—a grain boundary—a main phase grain—a grain boundary—a main phase grain—a grain boundary—a main phase grain, etc., along this line, with several grain boundaries 23 interposed serially between the main phase grains 22. When this serially combined capacitance, the capacitance for the main phase grain 22, and the capacitance for the low dielectric constant phase containing Si distributed at the grain boundary 23 are respectively denoted by C, C1, and C2, the combined capacitance C is represented as follows.

$$1/C=1/C1+1/C2+1/C1+1/C2+1/C1+1/C2+1/C1+\ldots$$

In this equation, the number of terms 1/C2 is increased when the low dielectric constant phase is thinly and widely distributed at the grain boundary 23, to increase the value of the term 1/C, thereby decreasing the combined capacitance C. Accordingly, the dielectric ceramic 21 as a whole described in Patent Document 1 has a deceased dielectric constant.

It is to be noted that when the dielectric ceramic 21 is subjected to grain growth to reduce the total number of main phase grains 22, the number of grain boundaries 23 through which the line described above passes is also reduced, allowing the decrease in dielectric constant to be suppressed. In this case, however, the laminated ceramic capacitor will encounter the problem that its temperature characteristic of capacitance is easily degraded.

SUMMARY OF THE INVENTION

Therefore, an object of the invention is to provide a dielectric ceramic, and a laminated ceramic capacitor configured with the use of the dielectric ceramic, which can solve the problems described above.

This invention is first directed to a dielectric ceramic containing $ABO_3$ (A necessarily contains Ba, and may further contain at least one of Ca and Sr; B necessarily contains Ti, and may further contain at least one of Zr and Hf) as a main component, and Si as an accessory component, and has a feature in that the following constitution is included in order to solve the technical problems described above.

More specifically, the dielectric ceramic according to the invention contains main phase grains including the main component and secondary phase grains having a composition different from that of the main phase grains, and has a feature in that the ratio of the Si content in the secondary phase grains to the total content of Si in the dielectric ceramic is 40% or more. The composition of the secondary grains is not critical as long as it is different from that of the main grains.

In the dielectric ceramic according to this invention, it is preferable that the Si content in the secondary phase grains is 30 mol % or more.

In addition, this invention is directed to a laminated ceramic capacitor including a capacitor main body composed of a plurality of dielectric ceramic layers laminated, and a plurality of internal electrodes formed along a specific interface between the dielectric ceramic layers; and a plurality of external electrodes formed in positions different from each other on the outer surface of the capacitor main body, and electrically connected to specific ones of the internal electrodes.

A laminated ceramic capacitor according to the invention has a feature in that a dielectric ceramic layer is composed of the dielectric ceramic according to the invention as described above.

In the dielectric ceramic according to the present invention, the low dielectric constant phase containing Si is distributed more in the secondary phase grains such a way that the ratio of the Si content in the secondary phase grains to the total content of Si in the dielectric ceramic is 40% or more. Thus, while the size of the low dielectric constant phase is increased, the number of the low dielectric constant phase is reduced. Therefore, the effect of the low dielectric constant phase is reduced, thereby improving the dielectric constant of the entire dielectric ceramic.

When the Si content in the secondary phase grains is made 30 mol % or more in the dielectric ceramic according to the present invention, the secondary phase grains can be reduced in size without increasing the number of the secondary phase grains. Therefore, the uniformity of the dielectric ceramic is increased, thereby allowing the insulation properties and reliability to be enhanced.

Accordingly, the laminated ceramic capacitor configured with the use of the dielectric ceramic according to the invention improves the dielectric constant of the dielectric ceramic constituting the dielectric ceramic layers, thereby allowing the laminated ceramic capacitor to be reduced in size.

DETAILED DESCRIPTION OF THE INVENTION

Figure 1:
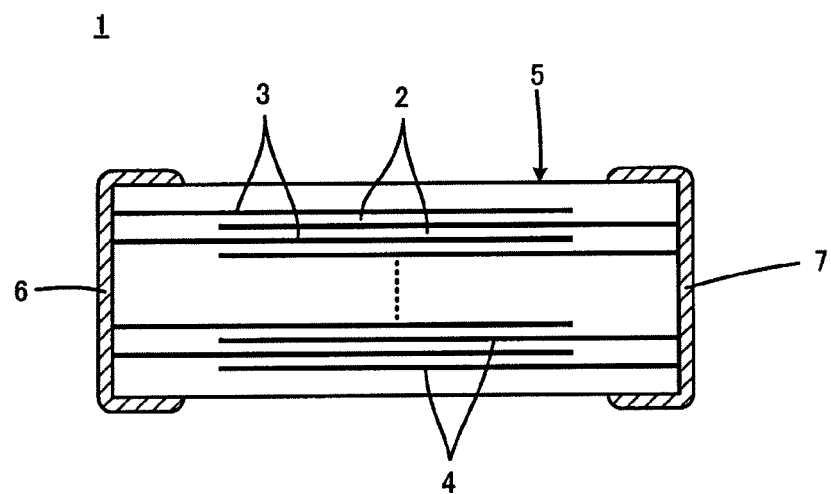
FIG. 1 is a cross-sectional view schematically illustrating a laminated ceramic capacitor 1 configured with the use of a dielectric ceramic according to the invention.

First, a laminated ceramic capacitor 1 to which a dielectric ceramic according to the invention is applied will be described with reference to FIG. 1.

The laminated ceramic capacitor 1 includes a capacitor main body 5 composed of a plurality of laminated dielectric ceramic layers 2 and a plurality of internal electrodes 3 and 4 along interfaces between adjacent dielectric ceramic layers 2. The internal electrodes 3 and 4 can contain, for example, Ni, as their main component.

First and second external electrodes 6 and 7 are formed in positions different from each other on the outer surface of the capacitor main body 5. The external electrodes 6 and 7 can contain Ag or Cu as their main components. In the laminated ceramic capacitor 1 shown in FIG. 1, the first and second external electrodes 6 and 7 are formed on each end faces of the capacitor main body 5 opposed to each other. The internal electrodes 3 and 4 include a plurality of first internal electrodes 3 electrically connected to the first external electrode 6 and a plurality of second internal electrodes 4 electrically connected to the second external electrode 7, and these first and second internal electrodes 3 and 4 are interlaminated in the laminate direction.

In this laminated ceramic capacitor 1, the dielectric ceramic layers 2 are composed of a dielectric ceramic containing $ABO_3$ (A necessarily contains Ba, and may further contain at least one of Ca and Sr; B necessarily contains Ti, and may further contain at least one of Zr and Hf) as a main component, and Si as the accessory component. This dielectric ceramic enlarged is shown schematically in FIG. 2.

Figure 2:
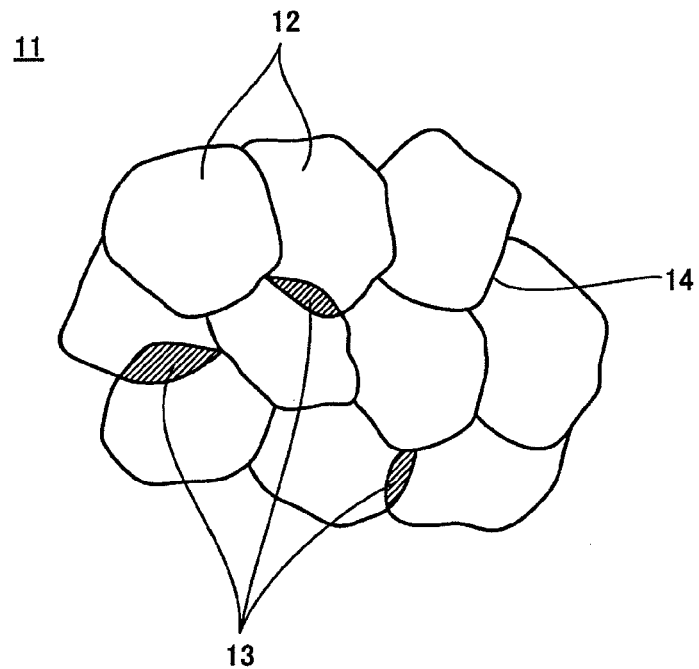
FIG. 2 is a diagram schematically illustrating an enlarged dielectric ceramic 11 according to the invention.
Figure 3:
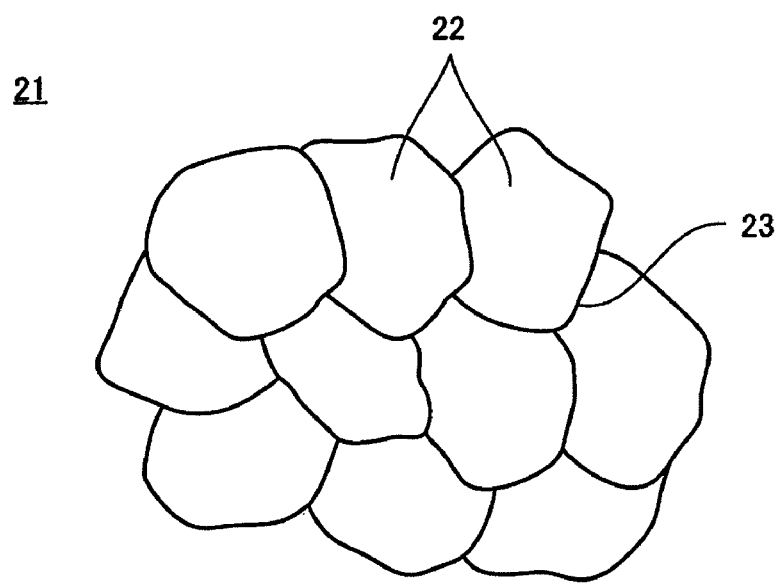
FIG. 3 is a diagram schematically illustrating a conventional dielectric ceramic 21 in connection with the invention.

Referring to FIG. 2, a dielectric ceramic 11 includes main phase grains 12 containing the main component described above, and secondary phase grains 13 having a composition different from that of the main phase grains 12, and a grain boundary (including a triple point) 14 is formed between the grains 12 and 13. The invention has a feature in that Si is distributed more in the secondary phase grains 13 such a way that the ratio of the Si content in the secondary phase grains 13 to the total content of Si in the dielectric ceramic 11 is 40% or more.

The secondary phase grains 13 mentioned above has a composition different from that of the main phase grains 12 as described above. This difference in composition is clear, and can be observed as a segregation in SEM-WDX mapping analysis.

In the dielectric ceramic 11 according to the invention, the Si is more present in the secondary phase grains 13. Therefore, Si present at the grain boundary 14 is reduced. It is to be noted that there is almost no Si incorporated in the main phase grains 12.

As described above, Si is locally present more in the secondary phase grains 13, rather than being widely distributed in the dielectric ceramic 11, thereby resulting in a state in which few low dielectric constant layers which are relatively large in size are present. Therefore, the low dielectric constant phase at the grain boundary 14 may be substantially negligible.

Herein, when a line directed in the lamination direction is drawn between the internal electrodes 3 and 4 shown in FIG. 1, a few secondary phase grains 13 are distributed between the main phase grains 12, for example, a main phase grain—a main phase grain—a main phase grain—a secondary phase grain—a main phase grain—a main phase grain—a main phase grain—, etc., along this line. When the combined capacitance for the dielectric ceramic layer 2 between the internal electrodes 3 and 4, the capacitance for the main phase grain 12, and the capacitance for the low dielectric constant phase in the secondary phase grain 13 are respectively denoted by C, C1, and C2, the combined capacitance C is represented as follows.

$$1/C = 1/C1 + 1/C1 + 1/C1 + 1/C2 + 1/C1 + 1/C1 + 1/C1 + \ldots$$

In the invention, the number of the term $1/C2$ is small. Therefore, the value of the term $1/C$ is prevented from being increased, and as a result, the decrease in the combined capacitance C is minimized.

Accordingly, the total content of Si is the same, but it is determined that the local distribution of Si in the secondary phase grains 13, rather than a wide distribution of Si at the grain boundary 14, is preferable in that the decrease in dielectric constant can be prevented.

Furthermore, it is preferable that the Si content in the secondary phase grains 13 is 30 mol % or more. This allows the secondary phase grains 13 to be reduced in size without increasing the number of the secondary phase grains 13. As a result, the insulation resistance of the laminated ceramic capacitor 1 can be increased, and the reliability can be improved.

Experimental examples carried out based on the invention will be described below.

(A) Manufacture of Ceramic Raw Material

First, $BaTiO_3$ powder as main component powder was prepared.

$SiO_2$ was selected as a sintering agent containing Si, and this $SiO_2$ powder and respective powders of $BaCO_3$, $MgCO_3$, $Dy_2O_3$, and $MnCO_3$ as additive components were prepared.

Then, the respective powders of $SiO_2$, $BaCO_3$, $MgCO_3$, $Dy_2O_3$, and $MnCO_3$ were added to the $BaTiO_3$ powder as the main component powder so that the contents of Dy, Mg, Si, and Mn were respectively 1.0 mol, 1.0 mol, 2.0 mol, and 0.5 mol with respect to 100 mol of $BaTiO_3$, and Ba/Ti was 1.010.

The blended powder was subjected to wet mixing in a ball mill for 24 hours, and then dried to give a ceramic raw material.

(B) Manufacture of Laminated Ceramic Capacitor

A polyvinyl butyral binder and an organic solvent such as ethanol were added to the ceramic raw material and wet mixing in a ball mill carried out for 30 hours, thereby preparing ceramic slurry.

Next, this ceramic slurry was subjected to sheet forming by the doctor blade method to obtain a rectangular ceramic green sheet so that the dielectric ceramic layers had a thickness of 1.0 mm after calcination.

Next, a conductive paste containing Ni was screen-printed on the ceramic green sheet described above to form a conductive paste film to serve as internal electrodes.

A plurality of ceramic green sheets with the conductive paste films formed thereon were laminated so that the opposed sides from which the conductive paste films were drawn were alternated, thereby obtaining a raw laminated body to serve as a capacitor main body.

Next, the raw laminated body was heated to a temperature of 300° C. in a $N_2$ atmosphere to burn off the binder, and a calcination step was then carried out under the condition of keeping at a top temperature of 1160° C. for 10 minutes in a reducing atmosphere composed of a $H_2$—$N_2$—$H_2O$ gas with an oxygen partial pressure set at $5.33 \times 10^{-10}$ MPa.

In the calcination step, some samples was manufactured which had various secondary phase areas and Si contents (Si distribution state) that were different from each other, by varying the rate of temperature reduction from the top temperature, and the temperature, time, and oxygen partial pressure in keeping the temperature fall respectively as shown in the respective columns of the "Temperature Fall Rate", and the "Temperature", "Time", and "Oxygen Partial Pressure" of the "Conditions for Keeping Temperature Fall" in Table 1.

A Cu paste containing $B_2O_3$—$Li_2O$—$SiO_2$—$BaO$ glass frit was applied to the opposed edge surfaces of the obtained laminated body, and baked at a temperature of 800° C. in a $N_2$ atmosphere to form external electrodes electrically connected to the internal electrodes, thereby obtaining laminated ceramic capacitor samples.

The laminated ceramic capacitor thus obtained had outer dimensions of a width 1.6 mm, a length 3.2 mm, and a thickness 1.0 mm, and the thickness of the dielectric ceramic layer interposed the internal electrodes was 1.0 μm. Further, the number of effective dielectric ceramic layers was 50, and the area of the internal electrode opposed per ceramic layer was 3.2 mm².

(C) Evaluation of Electrical Characteristics

Next, the laminated ceramic capacitors obtained were evaluated for the dielectric constant at room temperature, dielectric loss, temperature characteristic of capacitance, high temperature load lifetime characteristics, and insulation resistance at high temperature, as shown in Table 2.

More specifically, the capacitance and dielectric loss (tan δ) were measured under the conditions of a temperature of 25° C., 120Hz, and 0.5 Vrms. The dielectric constant was obtained from the obtained capacitance.

For the temperature characteristics of capacitance, the rate of change in capacitance at −25° C. to 85° C. was obtained with respect to the capacitance at 25° C. as a reference. Table 2 shows the maximum value of the rate of change.

For the high temperature load lifetime characteristics, a high temperature load test of applying a voltage of 10 V and 20 V (corresponding to electric field strengths 10 kV/mm and 20 kV/mm) at a temperature of 105° C. was carried on the 100 of each sample, with breakdown being considered to occur when the insulation resistance value fell to 200 kΩ or less before the elapse of each period of time, 1000 hours and 2000 hours, and the number of defective samples was noted.

Furthermore, for the insulation resistance (IR) at high temperature, a voltage of 10 V (an electric field strength of 10 kV/mm) was applied at a temperature of 125° C., and the log IR was calculated from the current value after 60 seconds.

(D) Evaluation of Secondary Phase

In this example, the secondary phase grains were defined as grains 0.1 μm or more in diameter in section, with a phase clearly different in composition from the main phase grains composed of $BaTiO_3$.

A 50 μm×50 μm field of view through SEM was subjected to WDX mapping to identify secondary phase grains containing Si. This observation was carried out for 5 fields of view in total. The mean values for the compositions of the multiple secondary phase grains identified by this observation are shown in the column "Secondary Phase Composition" of Table 1. It is to be noted that the secondary phase in the "Secondary Phase Composition" of Table 1 is an oxide. Furthermore, the areas of the identified secondary phase grains were added together to obtain the area ratio (%) of this area to the area of the total field of view. This area ratio is shown in the column "Area Ratio of Secondary Phase" of Table 1.

When the Si content ratio (mol %) in the "Secondary Phase Composition" mentioned above is multiplied by the "Area Ratio of Secondary Phase", the Si content ratio in the secondary phase in the entire dielectric ceramic is obtained, and when this Si content ratio is divided by the total Si content (2 mol %), the ratio of Si collected in the secondary phase grains to the total Si content is obtained. This ratio is shown in the column "Si Content in Secondary Phase/Total Si Content" of Table 1.

TABLE 1

| Sample Number | Conditions for Keeping Temperature Fall | | | Temperature Fall Rate (° C./minute) | Mean Grain Size (nm) | Total Si Content (mol %) | Secondary Phase Composition (mol %) | | | | | Area Ratio of Secondary Phase (%) | Si Content in Secondary Phase/Total Si Content (%) |
|---|---|---|---|---|---|---|---|---|---|---|---|---|---|
| | Temperature (° C.) | Time (minute) | Oxygen Partial Pressure ($10^{-14}$ MPa) | | | | Ba | Ti | Ni | Mg | Si | | |
| 1 | — | 0 | — | 10 | 143.5 | 2 | 49 | 14 | 7 | 8 | 22 | 1.9 | 20.9 |
| 2 | 900 | 10 | 4.43 | 10 | 147.5 | 2 | 48 | 14 | 8 | 7 | 22 | 2.9 | 31.9 |
| 3 | 900 | 30 | 4.43 | 10 | 148.2 | 2 | 48 | 13 | 7 | 7 | 24 | 3.5 | 42.0 |
| 4 | 900 | 60 | 4.43 | 10 | 149.5 | 2 | 47 | 13 | 5 | 8 | 26 | 4.0 | 52.0 |
| 5 | 900 | 60 | 4.43 | 20 | 148.3 | 2 | 43 | 12 | 4 | 6 | 33 | 3.1 | 51.2 |
| 6 | 900 | 60 | 4.43 | 30 | 146.1 | 2 | 40 | 10 | 4 | 7 | 39 | 2.9 | 56.6 |
| 7 | 900 | 60 | 4.43 | 60 | 141.6 | 2 | 31 | 9 | 5 | 12 | 42 | 2.8 | 58.8 |
| 8 | 1000 | 60 | 2.37 | 10 | 155.3 | 2 | 47 | 13 | 6 | 11 | 23 | 4.5 | 51.8 |
| 9 | 950 | 60 | 3.38 | 10 | 150.1 | 2 | 46 | 13 | 6 | 9 | 25 | 4.2 | 52.5 |
| 10 | 850 | 60 | 0.617 | 10 | 147.9 | 2 | 42 | 11 | 3 | 12 | 32 | 2.9 | 46.4 |
| 11 | 800 | 60 | 0.061 | 10 | 146.1 | 2 | 39 | 9 | 3 | 14 | 35 | 2.8 | 49.0 |

TABLE 2

| Sample Number | Dielectric Constant ε | tan δ [%] | Rate of Change in Capacitance | logIR | High Temperature Load Lifetime Characteristics | | | |
|---|---|---|---|---|---|---|---|---|
| | | | | | 1000 hours | | 2000 hours | |
| | | | | | 10 [kV/mm] | 20 [kV/mm] | 10 [kV/mm] | 20 [kV/mm] |
| 1 | 2510 | 2.1 | −12.1 | 9.5 | 0/100 | 0/100 | 0/100 | 0/100 |
| 2 | 2640 | 2.1 | −12.8 | 9.3 | 0/100 | 0/100 | 0/100 | 1/100 |
| 3 | 2830 | 2.3 | −13.4 | 9.3 | 0/100 | 0/100 | 1/100 | 4/100 |
| 4 | 3120 | 2.8 | −14.6 | 9.4 | 0/100 | 0/100 | 1/100 | 5/100 |
| 5 | 3080 | 2.9 | −13.9 | 9.6 | 0/100 | 0/100 | 0/100 | 0/100 |
| 6 | 3140 | 3.0 | −14.7 | 9.5 | 0/100 | 0/100 | 0/100 | 0/100 |
| 7 | 3210 | 3.2 | −15.0 | 9.6 | 0/100 | 0/100 | 0/100 | 0/100 |
| 8 | 3200 | 3.1 | −15.0 | 9.2 | 0/100 | 0/100 | 3/100 | 8/100 |
| 9 | 3140 | 3.1 | −14.5 | 9.1 | 0/100 | 0/100 | 1/100 | 3/100 |
| 10 | 3160 | 3.2 | −14.5 | 9.8 | 0/100 | 0/100 | 0/100 | 0/100 |
| 11 | 3180 | 3.2 | −14.8 | 9.6 | 0/100 | 0/100 | 0/100 | 0/100 |

As seen from Tables 1 and 2, samples 1 and 2 have a "Si Content in Secondary Phase/Total Si Content" less than 40%. Thus, the dielectric constants of the samples 1 and 2 are relatively low.

In contrast to these samples, samples 3 and 4 have a "Si Content in Secondary Phase/Total Si Content" of 40% or more. Thus, the dielectric constants of the samples 3 and 4 are higher than those of the samples 1 and 2 even though the samples 3 and 4 have the "Mean Grain Size" comparable to those of the samples 1 and 2.

In addition, samples 5 to 11 also have the "Si Content in Secondary Phase/Total Si Content" of 40% or more. Thus, the dielectric constants of the samples 5 to 11 are higher than those of the samples 1 and 2.

Furthermore, samples 5, 6, 7, 10, and 11 have the Si content ratio of 30 mol % or more in the "Secondary Phase Composition". Therefore, in particular, as seen in the "the number of defective samples after 2000 hours", these samples 5, 6, 7, 10, and 11 have improved reliability.

What is claimed is:

1. A dielectric ceramic comprising $ABO_3$ in which A is Ba, optionally in combination with at least one of Ca and Sr, and B is Ti, optionally in combination with at least one of Zr and Hf as a main component, and Si as a accessory component,
   the dielectric ceramic containing main phase grains containing the main component and secondary phase grains which have a composition different from the main phase grains, the secondary phase grains having a diameter in section of at least 0.1 μm,
   wherein of the Si content in the secondary phase grains to the total content of Si in the dielectric ceramic is 40 mol % or more.

2. The dielectric ceramic according to claim 1, wherein the Si content in the secondary phase grains is 30 mol % or more.

3. The dielectric ceramic according to claim 2, wherein the Si content in the secondary phase grains to the total content of Si in the dielectric ceramic is at least about 42 mol %.

4. The dielectric ceramic according to claim 2, wherein the Si content in the secondary phase grains to the total content of Si in the dielectric ceramic is at least about 49 mol %.

5. The dielectric ceramic according to claim 1, wherein the Si content in the secondary phase grains to the total content of Si in the dielectric ceramic is at least about 42 mol %.

6. The dielectric ceramic according to claim 1, wherein the Si content in the secondary phase grains to the total content of Si in the dielectric ceramic is at least about 49 mol %.

7. A laminated ceramic capacitor comprising:
   a capacitor main body composed of a plurality of laminated dielectric ceramic layers, and a plurality of internal electrodes each of which is disposed at a different interface between adjacent dielectric ceramic layers; and
   at least two external electrodes disposed at positions different from each other on an outer surface of the capacitor main body, and each electrically connected to a different one of the internal electrodes,
   wherein the dielectric ceramic layers comprise the dielectric ceramic according to claim 6.

8. A laminated ceramic capacitor comprising:
   a capacitor main body composed of a plurality of laminated dielectric ceramic layers, and a plurality of internal electrodes each of which is disposed at a different interface between adjacent dielectric ceramic layers; and
   at least two external electrodes disposed at positions different from each other on an outer surface of the capacitor main body, and each electrically connected to a different one of the internal electrodes,
   wherein the dielectric ceramic layers comprise the dielectric ceramic according to claim 5.

9. A laminated ceramic capacitor comprising:
   a capacitor main body composed of a plurality of laminated dielectric ceramic layers, and a plurality of internal electrodes each of which is disposed at a different interface between adjacent dielectric ceramic layers; and
   at least two external electrodes disposed at positions different from each other on an outer surface of the capacitor main body, and each electrically connected to a different one of the internal electrodes,
   wherein the dielectric ceramic layers comprise the dielectric ceramic according to claim 4.

10. A laminated ceramic capacitor comprising:
    a capacitor main body composed of a plurality of laminated dielectric ceramic layers, and a plurality of internal electrodes each of which is disposed at a different interface between adjacent dielectric ceramic layers; and
    at least two external electrodes disposed at positions different from each other on an outer surface of the capacitor main body, and each electrically connected to a different one of the internal electrodes,
    wherein the dielectric ceramic layers comprise the dielectric ceramic according to claim 3.

11. A laminated ceramic capacitor comprising:
    a capacitor main body composed of a plurality of laminated dielectric ceramic layers, and a plurality of internal electrodes each of which is disposed at a different interface between adjacent dielectric ceramic layers; and
    at least two external electrodes disposed at positions different from each other on an outer surface of the capacitor main body, and each electrically connected to a different one of the internal electrodes,
wherein the dielectric ceramic layers comprise the dielectric ceramic according to claim 2.

12. A laminated ceramic capacitor comprising:
a capacitor main body composed of a plurality of laminated dielectric ceramic layers, and a plurality of internal electrodes each of which is disposed at a different interface between adjacent dielectric ceramic layers; and
at least two external electrodes disposed at positions different from each other on an outer surface of the capacitor main body, and each electrically connected to a different one of the internal electrodes,
wherein the dielectric ceramic layers comprise the dielectric ceramic according to claim 1.

* * * * *

UNITED STATES PATENT AND TRADEMARK OFFICE
CERTIFICATE OF CORRECTION

PATENT NO. : 8,288,301 B2
APPLICATION NO. : 12/691084
DATED : October 16, 2012
INVENTOR(S) : Masayuki Ishihara It is certified that error appears in the above-identified patent and that said Letters Patent is hereby corrected as shown below:

Title Page  (73) Assignee: should read, Murata Manufacturing Co., Ltd., Nagaokakyo-Shi, Kyoto-fu (JP)

Signed and Sealed this
Nineteenth Day of March, 2013

Teresa Stanek Rea
*Acting Director of the United States Patent and Trademark Office*